Feb. 21, 1939.  E. J. VON HENKE  2,147,868
METHOD OF WELDING
Filed May 12, 1936  4 Sheets-Sheet 1
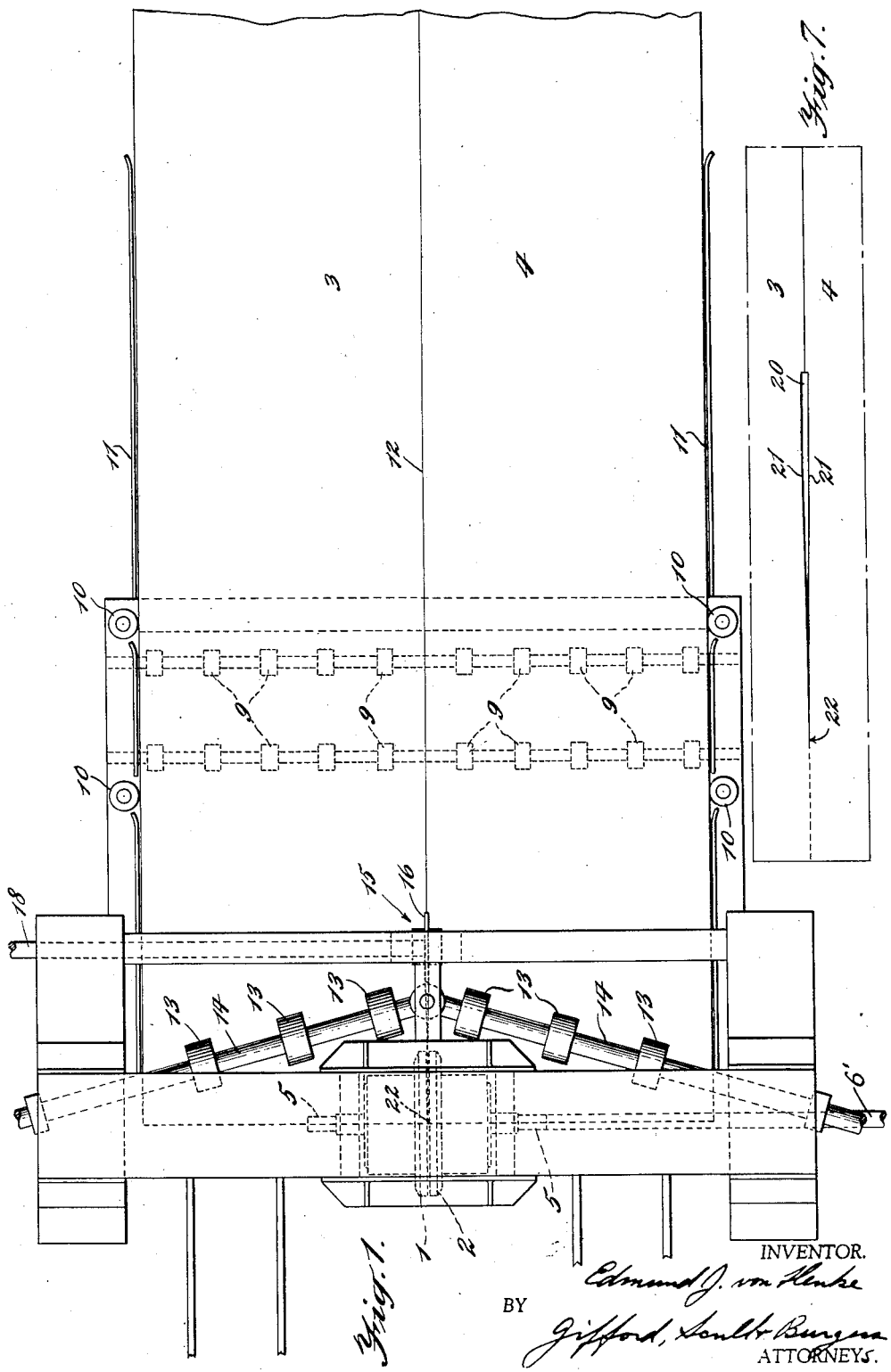
INVENTOR.
Edmund J. von Henke
BY
Gifford, Scull & Burgess
ATTORNEYS.

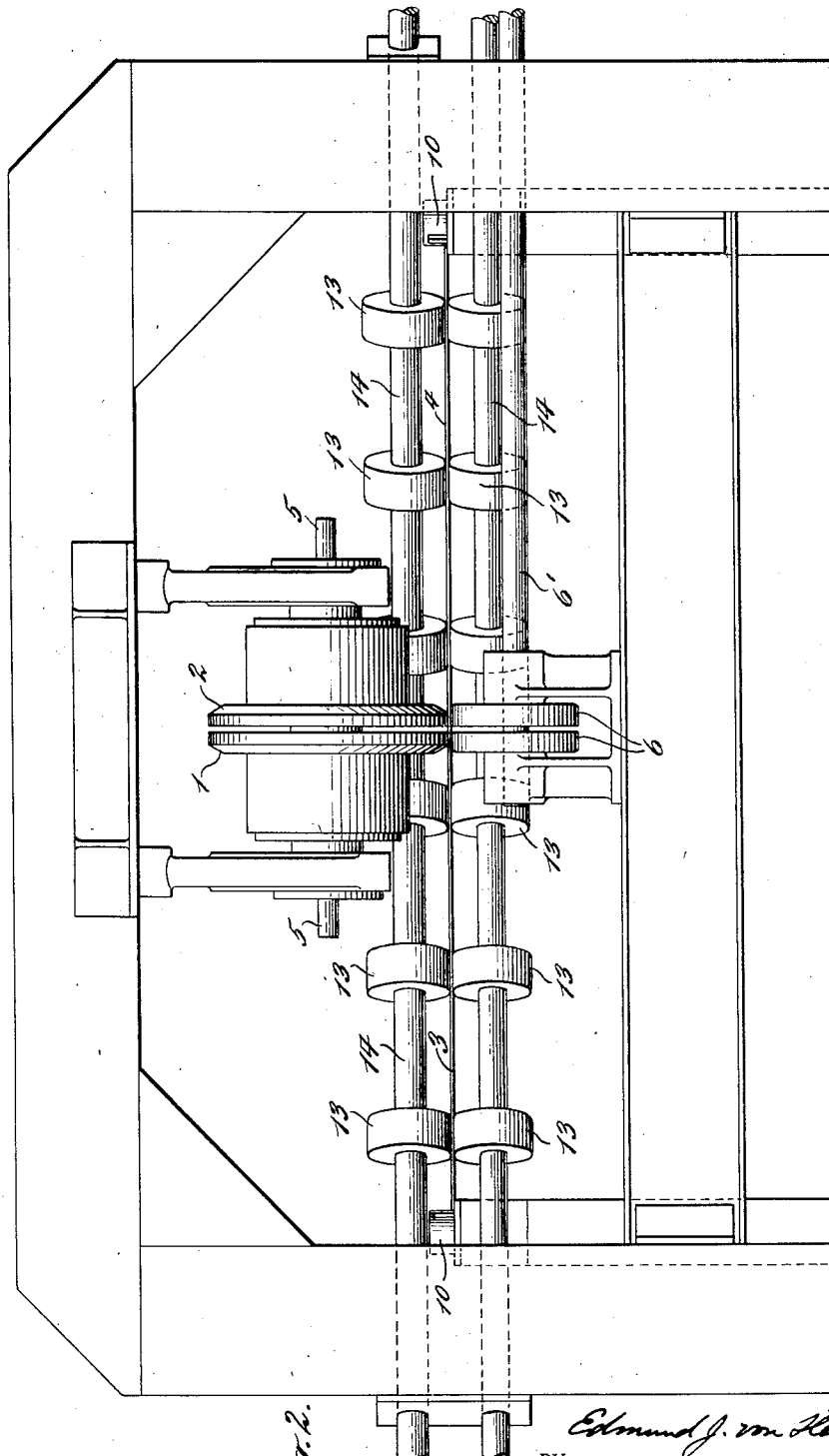

Feb. 21, 1939. E. J. VON HENKE 2,147,868
METHOD OF WELDING
Filed May 12, 1936 4 Sheets-Sheet 3
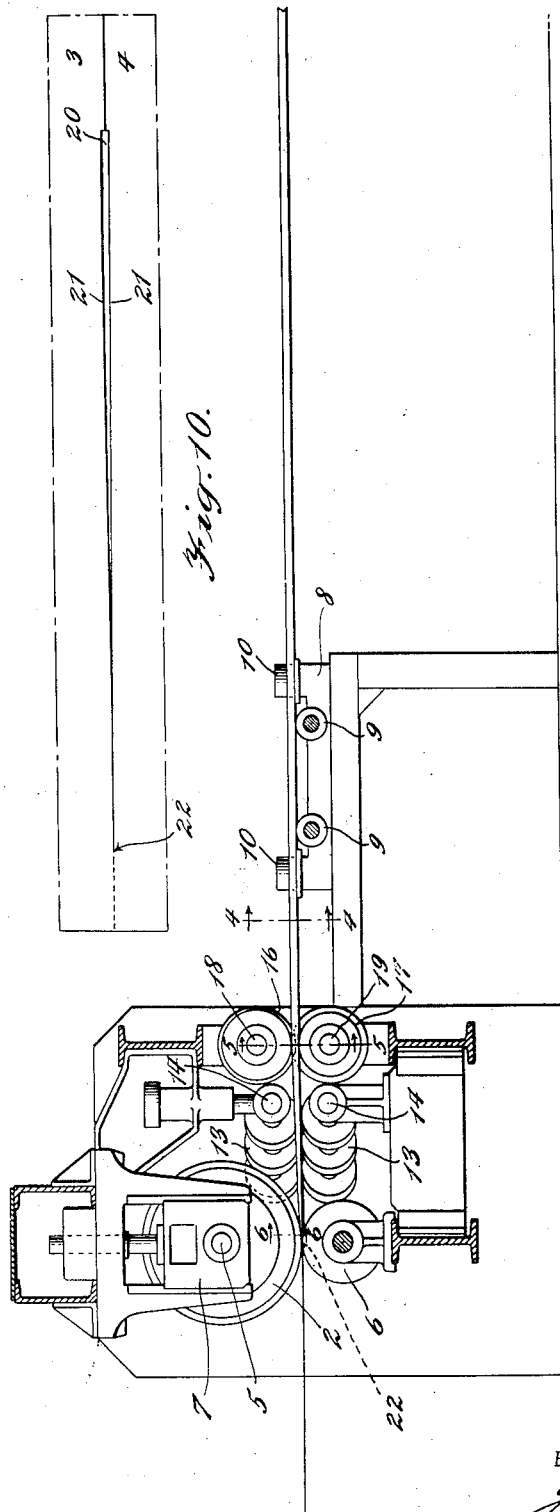
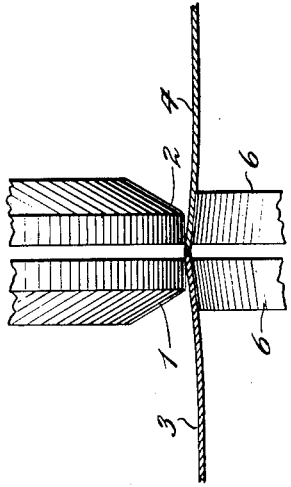
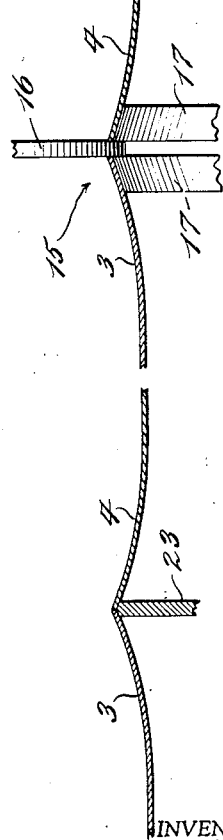
INVENTOR.
Edmund J. von Henke
BY
Gifford, Scull & Burgess
ATTORNEYS.

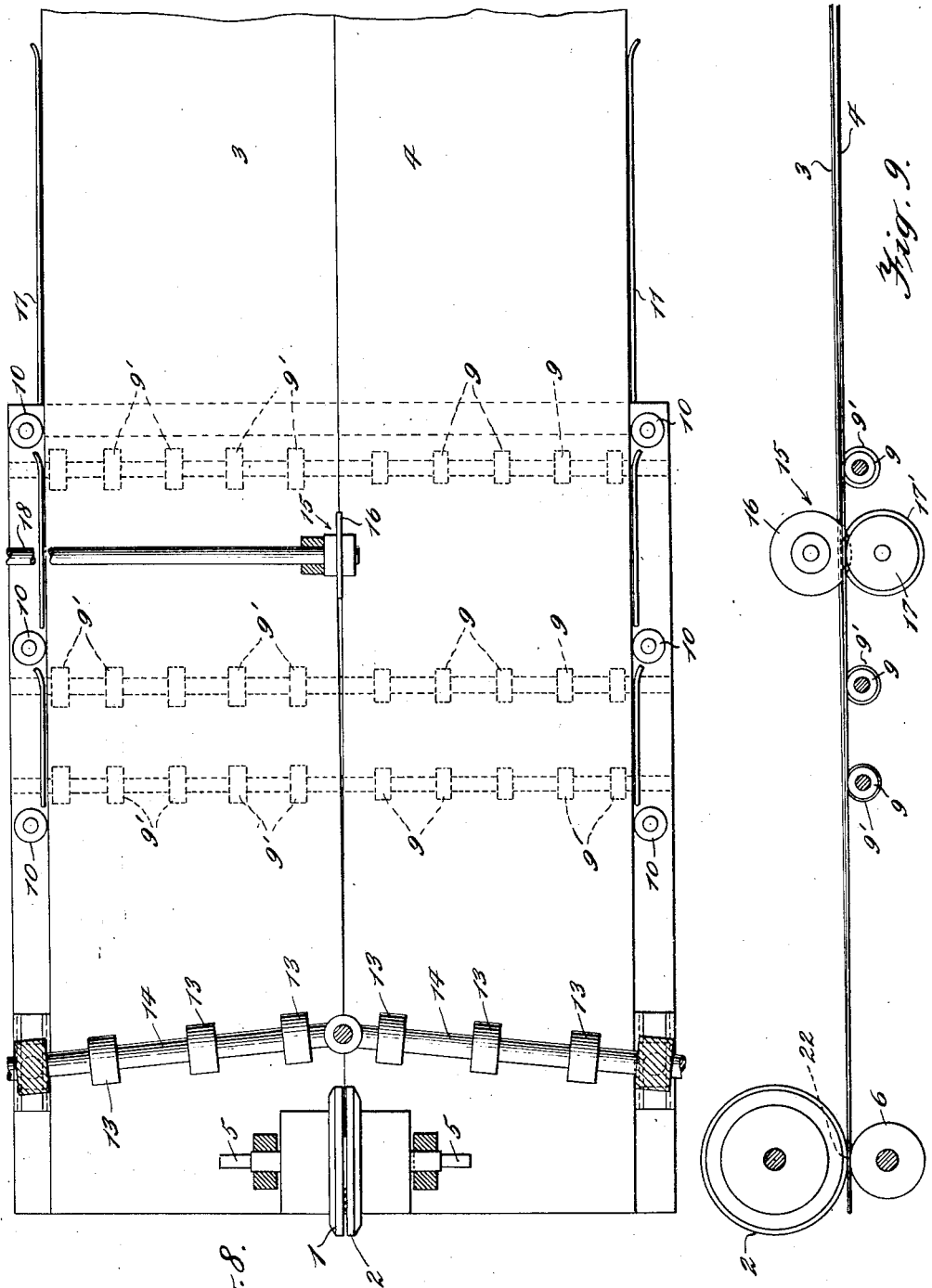

Patented Feb. 21, 1939

2,147,868

UNITED STATES PATENT OFFICE 2,147,868

METHOD OF WELDING

Edmund J. von Henke, Chicago, Ill., assignor to American Electric Fusion Corporation, Chicago, Ill., a corporation of Illinois Application May 12, 1936, Serial No. 79,224

3 Claims. (Cl. 219—10)

This invention relates to a novel and improved method of welding. The invention relates more particularly to the welding of sheets of metal and more particularly still to the welding of thin sheets and will be described in connection with welding that kind of material. In the accompanying drawings in which I have shown a selected embodiment of an apparatus for practicing my method:

Fig. 1 is a plan view of so much of the apparatus as is necessary for an understanding of the invention;

Fig. 2 is a view of the same apparatus as shown in Fig. 1, as seen from the left of Fig. 1;

Fig. 3 is a vertical elevation of the same apparatus as shown in Figs. 1 and 2;

Figs. 4, 5, and 6 are diagrammatic sections taken respectively on the lines 4—4, 5—5, and 6—6 of Fig. 3;

Fig. 7 is a plan view of part of the sheets appearing in Fig. 1;

Fig. 8 is a view similar to Fig. 1, but illustrating a different arrangement of the apparatus, adapted to practice the invention according to a different method than that followed with the apparatus of Fig. 1, certain parts of the apparatus, however, being omitted;

Fig. 9 is a diagrammatic elevation of the parts appearing in Fig. 8;

Fig. 10 is a view corresponding to Fig. 7, but illustrating the relation of the sheets to each other when welded with the apparatus of Figs. 8 and 9.

Referring first to Figs. 1 to 8, inclusive, the apparatus comprises a pair of welding electrodes 1 and 2 which are spaced apart as is common practice, so as to contact respectively with sheets 3 and 4 whose edges are to be welded together in a butt weld. While other types of electrodes may be found suitable, nevertheless it is preferable that they be of the rotatable kind illustrated, and which may be supported upon a shaft 5 so that the electrodes may rotate as work is fed into contact therewith.

Associated with the two electrodes are rollers 6 adapted to support the work immediately beneath the electrodes, the electrodes and rollers together forming what is sometimes called the welding throat. The shaft 5 is mounted in a vertically adjustable journal box 7 which may be adjusted by any suitable means, the details of which it is not deemed necessary to describe.

The invention is particularly adapted for use with thin sheets of steel or other weldable metal, on the order of 0.037″ to 0.062″ in thickness.

These sheets often come in widths of 40 to 48 inches, and in lengths up to 174 inches. The butt-welding of sheets of such dimensions has usually been done by what is known as flash welding, a process which necessitates an electric current of some 1500 kva. According to the method now to be described, it is possible to use a current of approximately 50 kva.

The sheets 3 and 4 are shown as mounted upon a table 8 upon which are rollers 9 extending at right angles to the direction of travel of the sheets towards the electrodes. The table may be provided with the usual guide rollers 10 and fixed guides 11.

The sheets will be placed upon the table so that the edges to be welded are substantially in contact along the line 12, and this line is in direct alignment with the space between the two electrodes so that, as the sheets are welded beneath the electrodes, each electrode will contact with one only of the two sheets.

Adjacent the electrodes I provide skew rolls 13 mounted on shafts 14 which rotate about axes inclined to the direction of travel of the sheets as indicated, and on the other side of these skew rolls from the electrodes I provide a cutter designated generally as 15 and which may consist of shearing knives 16 and 17. In this instance I have shown two of the knives 17 disposed beneath the sheets, as best indicated in Fig. 5, and the knife 16 as being rotatably mounted above the sheets but adapted to pass between the two knives 17 to perform a shearing operation on the two sheets 3 and 4. The knife 16 may be mounted upon the shaft 18, and the two knives 17 may be mounted upon a shaft 19, either one or both of which may be driven by any suitable mechanism, not shown. Similarly, the skew rolls 13 are disposed both above and below the sheets, and their shafts 14 may be driven from any suitable source of power. Likewise, the rolls 6 may be mounted upon a shaft 6′ which may be positively driven, if desired.

Assuming that the adjacent edges of the two sheets have been placed substantially in contact with each other along the line 12, then the cutter is so arranged that the knife 16 is centered substantially on that line and will remove the contiguous edges of the two sheets, thus leaving them spaced apart, as indicated at 20 in Fig. 7. The cutter not only forms this space, but also provides new edges of the two sheets which are accurately cut and free of inequalities. The skew rolls 13 then bring the new edges 21 gradually together until they meet substantially at the welding point 22, which is the point where the sheets are in contact with the welding electrodes. As they approach this point closely, the current will begin to pass across the space between the edges and thus provide flashing and a preliminary heating of metal before the welding heat and pressure are exerted under the welding electrodes.

The welding operation is aided still further by the arrangement best shown in Figs. 4, 5, and 6, wherein it is seen that the adjacent edges of the two sheets are raised slightly above the plane of the sheets so that the bottom corners of the two uncut edges are in contact before cutting. This result may be achieved by providing the support 23 which lifts the edges above their plane, as does also the shape of the knives 17, whereas the supporting rollers 6 only raise the edges slightly, the two edges at the electrodes being brought down substantially into the plane of the sheets, although still slightly raised above that plane. Cutting the raised edges results in beveling them, as will be seen, and thus as they come together on being lowered, the upper corners of the newly cut edges will come into contact first.

The cutter is a convenient way of providing true edges on the sheets and at the same time holding them spaced apart, although other spacing means may be provided if it is not found necessary to true up the edges of the sheets.

Referring now to Figs. 8, 9, and 10, the apparatus therein is one which comprises many elements appearing in the apparatus already described, and the description of which will not be repeated. In this instance, however, the sheets 3 and 4, instead of being disposed in a substantially common plane, except for their edge portions, as before, are now shown as disposed in different planes which gradually come together. By thus arranging the sheets and thus gradually bringing them together at the electrodes, the same advantages are achieved as bringing them gradually together in a horizontal direction. In the illustrated embodiment, I have shown them being brought together, both horizontally and vertically, using the cutter 15 as before to provide a horizontal space 20 between the sheets, and also to provide new edges which are truer than those ordinarily found on sheets of this character. In this instance, however, the cutter is placed further away from the electrodes, as plainly shown in Figs. 8 and 9.

The relative vertical displacement between the two sheets may be achieved by supporting the sheet 4 upon rollers 9 as formerly, but supporting the sheet 3 upon rollers 9' of larger diameter. Both the rollers 9 and 9' may be mounted upon the same shafts as shown, or may be mounted upon separate shafts if found expedient. Likewise, one of the knives 17 may be replaced with a larger knife 17'.

The operation of the method and the apparatus will, it is believed, be plain from the above description. I am aware that, while I have shown the invention as embodied in a specific form, various changes in details may be made without departing from the scope of the invention, as defined by the appended claims.

I claim:

1. The method of butt-welding the edges of sheets of metal which comprises spacing said edges apart in a direction transversely of the planes of said sheets, feeding said sheets into position wherein each sheet is in contact with one of a pair of welding electrodes and during said feeding movement bringing said edges gradually towards each other until they meet in a common plane where the sheets contact with said electrodes, and passing welding current through said electrodes and the joint formed by said meeting edges.

2. The method of butt-welding the edges of sheets of metal which comprises supporting said sheets in an approximately horizontal position, with said edges substantially in contact, raising said edges above the planes of the sheets, cutting away the edge portions of said sheets to form new beveled edges spaced apart, feeding said sheets into position wherein each sheet is in contact with one of a pair of welding electrodes and during said feeding movement bringing said new edges gradually towards each other until they meet substantially where they contact with said electrodes and shortly before said contact, lowering said edges to bring the upper corners thereof together before the lower corners meet, and passing welding current through said electrodes and the joint formed by said meeting edges.

3. The method of butt-welding the edges of sheets of metal which comprises spacing said edges apart both transversely of the planes of said sheets and also parallel to said planes, feeding said sheets into position wherein each sheet is in contact with one of a pair of welding electrodes, and during said feeding movement bringing said edges gradually towards each other both transversely of said planes and parallel thereto, until said edges contact with each other in a common plane substantially at said electrodes, and passing welding current through said electrodes and the joint formed by said meeting edges.

EDMUND J. von HENKE.